United States Patent [19]

Andersson

[11] 4,175,065

[45] Nov. 20, 1979

[54] METHOD FOR GLUEING WITH CURABLE, FORMALDEHYDE-BASED ADHESIVES AND A CURING COMPOSITION FOR USE IN THE METHOD

[75] Inventor: Sven-Erik Andersson, Nacka, Sweden

[73] Assignee: AB Casco, Stockholm, Sweden

[21] Appl. No.: 905,393

[22] Filed: May 12, 1978

[30] Foreign Application Priority Data

May 13, 1977 [SE] Sweden ................................ 7705636

[51] Int. Cl.$^2$ ............................................. C08L 61/10
[52] U.S. Cl. ................................... 260/29.3; 156/335; 252/308; 260/29.2 R; 260/37 R; 525/521; 428/541; 528/155; 528/227
[58] Field of Search ................... 260/29.2 R, 29.3, 64; 252/182, 308; 528/227; 156/335

[56] References Cited

U.S. PATENT DOCUMENTS

| | | | |
|---|---|---|---|
| 3,634,276 | 1/1972 | Kreibich et al. | 260/17.2 |
| 4,061,620 | 12/1977 | Gillern | 260/29.3 |

*Primary Examiner*—Theodore E. Pertilla
*Attorney, Agent, or Firm*—Fred Philpitt

[57] ABSTRACT

A hardener composition for precondensates or liquid resins containing resorcinol and formaldehyde or resorcinol-phenol and formaldehyde and a method for glueing by using them. The hardener composition contains powdered paraformaldehyde suspended in a suspending agent that includes a precondensate of ketone and formaldehyde, which precondensate preferably contains water as a dilution media.

11 Claims, No Drawings

METHOD FOR GLUEING WITH CURABLE, FORMALDEHYDE-BASED ADHESIVES AND A CURING COMPOSITION FOR USE IN THE METHOD

BACKGROUND

Laminated timber has been used since the nineteen twenties and have had an ever-increasing importance for structural wood constructions, such as beams and arches for the building industry. This strong evolution has been made possible by modern wood adhesives.

Initially only casein adhesives were used in the manufacturing of laminated timber. Later some urea resin adhesives and cold setting phenol resin adhesives started to be used, but recently the use of resorcinol resin adhesives and resorcinol-phenol resin adhesives has dominated. The reason is the very small aging transformations of these types of adhesives, especially when the wood constructions are exposed to weather. Since these adhesives cure in a neutral or weakly alkaline environment, there is no risk of wood material damage, whereas damage can be caused by cold setting phenol resin adhesives. Furthermore, the curing can be performed at room temperature or at only a slightly raised temperatures so that the risk for building tensions into the wood construction is reduced.

Normally the glueing is conducted in such a manner that a resorcinol-formaldehyde precondensate with deficiency of formaldehyde is mixed with a powdered hardener comprising filler and paraformaldehyde in such an amount that full cross-linking is obtained upon reaction with the precondensate. The powdered paraformaldehyde, which is the active component of the hardener, is continuously solved in the precondensate, whereby formaldehyde is first liberated, which then reacts with the precondensate. A mixture prepared of powdered hardener and precondensate or liquid resin is usually applied to the surfaces to be joined, either by use of a cylinder spreader or a so called bead spreader. A substantial disadvantage in using a mixture of powdered hardener and precondensate or liquid resin is the fairly short pot-life of the mixture. The use of powdered hardener containing filler and paraformaldehyde is furthermore connected with substantial sanitary inconveniences. Such a hardener produces a lot of dust and the finely divided paraformaldehyde present in the air of a work-room where powdered hardener is handled, strongly irrates eyes, nose, throat and lungs.

The relatively short pot-life problems with a mixture of powdered hardener and precondensate or liquid resin can be avoided by separate application of the precondensate or liquid resin and hardener, especially if the hardener is in liquid form. This can for instance be done by a combination of a cylinder spreader first and a bead spreader or with a combination of two bead spreaders arranged one after the other. Upon assembly of the surfaces to be joined and the subsequent press operation a mixing of the components is obtained and the curing reaction can then be completed. The separate application method of the two components also gives considerable handling advantages, since in the separate application method the hardener must be liquid, dust problems do not arise. A liquid hardener is normally composed of formaldehyde solution, the consistency of which, by use of different additives, can be adjusted to give a product which is spreadable from a bead spreader. A problem with this type of product is its strong smell of formaldehyde.

Swedish Pat. No. 7514289-3 discloses the use of a liquid hardener consisting of a stable suspension of finely ground paraformaldehyde in a non-volatile suspending agent such as liquid polyols or mixtures of liquid and solid polyols. By the use of powdered paraformaldehyde the odor problems are essentially avoided and the fact that the powder is dispersed means that the dust problems are avoided. The suspending agents mentioned are compatible with the wood material and with the components of the adhesive and are non-volatile, which is an advantage from the standpoint of stability, hygiene and fire security. However, to avoid the disintegration of paraformaldehyde into formaldehyde, these suspending agents must be as water-free as possible, which can cause troubles due to the hydroscopic nature of these products. It is known to add absorbents for formaldehyde, such as urea, to such mixtures to eliminate the smell of formaldehyde. The reaction occuring between urea and formaldehyde first produces ureaformaldehyde complexes of low molecular weight, which after a certain storage time continue to react with each other to produce resin-like products with higher molecular weight. This means that a liquid hardener for separate bead application with a composition as mentioned above has a tendency to thicken after a certain storage time, whereby problems may arise in spreading a sufficient amount of hardener during the application.

The use of polyols may also eventually cause certain problems in the glued joint. Polyols are compatible with both the resin and the wood material, which is a necessity. However, since the polyols do not participate in the chemical reaction between the resin and the paraformaldehyde, but are only built into the resin structure as an external plasticizer, they can be leached out after a long time outdoors. In such a case a weakened glue joint may be the result. Another possibility is that the polyols may be absorbed by the wood material closest to the glue line. This layer may thereby be softened, which also results in a weakened joint.

THE PRESENT INVENTION

The present invention relates to an improved method for glueing by use of formaldehyde-based resorcinol-containing resins where hardener compositions are made use of which contain paraformaldehyde suspended in a suspending agent. The invention also concerns an improved hardener composition.

The invention is characterized in that as suspending agent for the paraformaldehyde a precondensate between a ketone and formaldehyde is used.

According to one preferred embodiment, water is incorporated as a viscosity regulating means in the hardener composition.

According to another preferred embodiment, the pH is adjusted to between 2 and 6 in the suspension.

According to an additional preferred embodiment the pH is adjusted to between 3.5 and 5 in the suspension.

According to a further embodiment, the ketone is acetone.

According to another preferred embodiment the resin and the hardener are spread in the form of separate beads on at least one of the surfaces to be joined.

According to another preferred embodiment, the hardener composition contains a filler.

In principle all ketones which when reacted with formaldehyde give a precondensate with enough water solubility and reactivity can be used as suspending agents according to this invention. However, in view of other aspects, such as the strength and stability in the resin structure, price, simple metylolization reaction, etc., lower mono-alkylketones with 1 to 6 carbon atoms in each alkyl chain, are preferred, suitably diethylketone, methyl-ethylketone, and dimethylketone, preferably the latter. Other groups than straight carbon chains can be present. Further carbonyl groups or other electronegative groups should be present in higher ketones to obtain sufficient water solubility and reactivity.

In the manufacture of the precondensate by reaction between ketone and formaldehyde, which can be conducted in an alkaline environment in a known manner, a mixture of molecules with different degrees of condensation is produced. The degree of condensation determines to some extent the viscosity and water solubility of the product. To have a sufficient cross-linking and reaction relative to the resorcinol formaldehyde or resorcinol-phenol formaldehyde precondensate, each ketone molecule should on an average contain several methylol groups. For these reasons, the reaction for lower ketones is performed with a ketone-formaldehyde molar ratio in the range of 1:2–1:5 and preferably between three and four molecules of formaldehyde react with each molecule of ketone, since this gives good stability against release of formaldehyde in spite of sufficient reaction possibility of the precondensate. Preferably this contains mainly monomers of the methylolized ketone and only small amounts of dimers or higher complexes, since a further fusion of the molecules strongly reduces the water solubility and thereby the compatibility with other components. Also the viscosity increases unfavorably. In its monomer form the product is generally so viscous that in the pure state it does not lend itself as a suspending agent for the powdered paraformaldehyde. An upper limit for the viscosity of the suspension agent is set by the practical use of a hardener composition according to the invention and in view of the stability and spreadability there is also a lower limit for the viscosity. To avoid addition of large quantities of solvent, which negatively affects the glueing, a too high viscosity of the pure ketone resin is not desired.

Water is preferred among the possible dilution substances for the ketone precondensate. This is diluted, or the reaction solution evaporated, to a solid content preferably between 50 and 70 percent by weight prior to the addition of powdered paraformaldehyde or other additives. The viscosity without additives preferably is between 20 and 300 cP for a solution of 60 percent by weight solid content in water at 25° C.

By use of a precondensate between a ketone and formaldehyde as a suspending agent for the paraformaldehyde in accordance with the present invention, a number of advantages are gained over those normally obtained by polyols. The precondensate contains reactive methylol groups, whereby the suspending agent acts as a glueing component when it is contacted with the resorcinol-formaldehyde or resorcinol-phenol formaldehyde precondensate and participates together with the precondensate in the final condensation reaction and is built into the final resin structure. Contrary to previously used suspending agents based on polyols, this building-in of the suspending agents means that it will not act as a plasticizer, and thereby weaken the joint but will instead contribute to the strength of the joint. By the hydroscopic nature of polyols they tend to retain in the joint, which prevents it from obtaining maximum strength, while the hydroscopic nature of the suspending agent of the present invention disappears when it is built into the resin structure. Nor will the suspending agent according to the present invention retard the curing of the resin as has been the case with previously used suspending agents. A further advantage of the suspending agent of this invention is that it has proved to have a very suitable consistency for bead application due to the negligible tendency of an extruded string to break up into small droplets before reaching the treated surface.

The adjustment of the suspending agent to a pH between 2 and 6 and preferably to between 3.5 and 5 favorably prevents the tendency of paraformaldehyde to disintegrate into free formaldehyde and thereby cause odor problems. The suspending agent is also stable in this pH interval and neither give off formaldehyde nor continues to react to higher molecular weights. On the contrary, the ketone-formaldehyde product is able at this pH-value to bond a certain amount of free formaldehyde by forming acetals and hereby further suppress odor problems.

It is especially beneficial to use the present invention in connection with separate application of precondensate or liquid resin and hardener since the good viscosity properties of the hardener composition will in this situation facilitate the normally troublesome application of this component to an even distribution and good intermixing with the resin component during assembly.

To function in the above discussed manner, the suspending agent of the present invention must be reactive enough relative to the resorcinol component and compatible with the wood and the resin and for these reasons it is suitably at least partly water-soluble, and preferably it can be diluted with unlimited amounts of water.

To the diluted ketone resin finely ground paraformaldehyde is added, whereby a stable suspension is normally easily obtained if about 40 to 70 parts by weight of paraformaldehyde is added to 100 parts of suspending agent. The presence of water in the suspension agent, however, tends to liberate formaldehyde from the powdered paraformaldehyde causing odor problems. An adjustment of pH in the suspension is therefore preferred as above discussed. The hardener composition so obtained is then chemically fairly stable but gradually the paraformaldehyde will disintegrate to such an extent that odor beings to arise and then it may be suitable to prepare a fresh hardener composition after some time, for example after some days. Compared with the previous preparation of resin/hardener mixture 5 to 10 times per day, the present invention means considerably less handling of powdered paraformaldehyde.

A filler can be mixed into the hardener composition in order to alter the viscosity or increase the volume. The latter possibility is especially beneficial when separately applying the resin and hardener components since spreading problems may arise if the volume difference between the components is too large. Suitable fillers are the neutral or weakly acid ones, such as kaolin, cocao-nut shell flour, walnut shell flour, wood flour, etc. However, the addition of fillers means that the calculated amount of paraformaldehyde that for viscosity reasons can be incorporated in the suspension is reduced.

The hardener composition may also contain other additives, such as thickeners, dispersing agents, protecting colloids, coloring agents, buffering agents, plasticizers etc.

Preferably the hardener is composed in the following manner expressed in percent by weight of the total composition:

| ketone-formaldehyde precondensate (100%) | 20–40 |
| water | 10–30 |
| paraformaldehyde | 10–60 |
| filler | 0–50 |

When using a hardener according to the invention, the solid content of the resorcinol-formaldehyde or resorcinol-phenol precondensate should exceed 50% in order to obtain best glueing results. The ratio between the amount of said precondensate or liquid resin and the amount of hardener brought to the joint should be based on that to 100 parts of a resorcinol precondensate or liquid resin of 60% shall be added between 4 and 15 parts of paraformaldehyde and preferably between 10 and 60 parts of hardener composition.

The mixture of resin precondensate and hardener should be alkaline, whereby the paraformaldhyde disintegrates and reacts with the resorcinol and also the suspending agent is activated and reacts.

In the manufacture of laminated timber, which is the most important application of the invention, the application of the resorcinol-formaldehyde or resorcinol-phenol precondensate and hardener according to the invention is preferably performed by two spreaders arranged one after the other, as stated above. The use of a hardener according to the invention is, however, not restricted only to laminated timber manufacturing and separate application, but the hardener may also in a usual manner be mixed into the adhesive and the mixture spread by common spreading equipment.

The above invention can be better understood by reference to the following examples, which are merely illustrative and not limiting.

EXAMPLE 1

Comparative bead spreading tests with test pieces of redwood in sizes of 15×30 cm.

(a) On one side of the above mentioned test pieces an adhesive mixture consisting of 100 parts of resorcinol-phenol-formaldehyde precondensate (molar ratio 1:1:1.29) having a solid content of about 55% and 20 parts of a powder hardener based on paraformaldehyde and filler (cocoa-nut shell flour) was spread in the form of strands by use of a laboratory bead spreader. The adhesive strands were about 3 to 4 mm in thickness and their mutual distance about 5–6 mm. Immediately after the spreading, the test pieces were assembled so that a non-treated surface was placed on an adhesive treated surface. Afterwards they were placed in a laboratory press and were pressed at a pressure of about 8 kp/cm² in a heating chamber with a temperature of about 40° C. The press operation was conducted for 6 hours.

(b) By use of two laboratory bead spreaders arranged one after the other was spread on one side of the above mentioned test pieces a resorcinol-phenol resin and a hardener according to the present invention so that a ratio of 27 parts of hardener per 100 parts of resin was obtained. The resin was a resorcinol-phenol-formaldehyde resin with a molar ratio of 1.5:1:1.5 and a resin content of about 60% and containing about 6% of cocoa-nut shell flour as a filler. The hardener was a mixture of 100 parts of acetone-formaldehyde precondensate and 60 parts of paraformaldehyde.

The acetone-formaldehyde precondensate was condensed in alkaline environment in a known manner (molar ratio 1:3.1) to a solids content of about 50%. By use of formic acid the pH of the resin was adjusted to about 5.

Immediately after the separate application of resin and hardener the test pieces were assembled and pressed under the above discussed conditions.

The adhesive joints were tested 1 day after the glueing by tearing pieces apart whereby the following results were obtained (100% indicates complete wood failure):

| A mixture of resin and powder hardener | |
| --- | --- |
| Joint 1 | 95% |
| Joint 2 | 80% |
| Joint 3 | 70% |
| Separate application of resin and hardener | |
| Joint 1 | 95% |
| Joint 2 | 60% |
| Joint 3 | 75% |

These laboratory tests showed that the strength of the glue joint was not deteriorated by separate application of resin and hardener according to the invention, i.e. the mixing of resin and hardener was sufficient for obtaining a good glueing result.

At 1, 2 and 4 days after the preparation of the hardener composition this was tested in the laboratory bead spreader to determine how the aging of the hardener composition affected its properties. With the same adjustment of the bead spreader 1100 grams of hardener mixture per minute was obtained after 1, 2 and 4 days which was exactly the same amount adjusted for the fresh mixture. After 1 and 2 days no smell of formaldehyde from the hardener composition could be detected. These results indicate that such a hardener mixture can be used in at least 2 days.

EXAMPLE 2

In manufacturing factory scale a full scale test run was performed with two bead spreaders one arranged after the other, whereby the same resin and hardener were used as were described in example 1b. The amount of resin was 213 g/m² and the amount of hardener 57 g/m² (total amount 270 g/m², mixing ratio 100:27). After spreading, the beams were assembled in an usual manner and the beams were brought into a press after an average of about 20 minutes of closed waiting time. The pressing operation was conducted in a continuous belt press with high frequency heating. The press temperature was determined immediately after the press operation to an average of 85°–90° C. The press time was 2.5 minutes and the press force about 10 kp/cm². In this way two beams comprising 15 laminae and two beams comprising 6 laminae were produced.

Test specimens were cut from the 4 beams, which were tested both after one day in the tearing apart manner described in example 1(b) and in a delamination test according to standard ASTM D1101-59. According to this standard the beam specimens are first exposed to a vacuum of 0.5 atmospheres for 15 minutes, then to cold water for 2 hours and at 10 atmospheres, whereafter this procedure was repeated. Then the samples were dried at 29° C. for 91.5 hours in an air stream with a speed of 2.5±0.25 m/second, whereafter the whole of the cycle was repeated one more time. The result was judged in such a manner that the delamination in the form of % glue line that have come off was determined. The standard requires a delamination of less than 5% of the total glue line length for acceptable glueings. Furthermore the beams were tested by tearing apart after passed delamination cycles and % wood failure were determined in the same way as in example 1.

Results beam 1 and 2

| Joint | Beam 1 | | | Beam 2 | | |
|---|---|---|---|---|---|---|
| | Before delamination cycles % wood failure | After delamination cycles % wood failure | mm of delamination | Before delamination cycles % wood failure | After delamination cycles % wood failure | mm of delamination |
| 1 | 95 | 85 | 0 | 80 | 70 | 0 |
| 2 | 70 | 80 | 0 | 90 | 70 | 0 |
| 3 | 70 | 90 | 0 | 90 | 75 | 0 |
| 4 | 75 | 50 | 0 | 85 | 65 | 0 |
| 5 | 65 | 70 | 0 | 80 | 70 | 0 |
| 6 | 75 | 85 | 0 | 65 | 80 | 0 |
| 7 | 65 | 85 | 0 | 70 | 80 | 0 |
| 8 | 85 | 80 | 0 | 80 | 65 | 0 |
| 9 | 55 | 45 | 0 | 60 | 80 | 0 |
| 10 | 70 | 45 | 0 | 85 | 50 | 20 |
| 11 | 80 | 75 | 0 | 30 | 20 | 3+3+7+10 |
| 12 | 80 | 75 | 0 | 75 | 30 | 0 |
| 13 | 70 | 45 | 0 | 75 | 60 | 6 |
| 14 | 60 | 85 | 0 | 65 | 65 | 0 |
| Average | 75 | 71 | 0% | 73 | 63 | 1.6% |

Results beam 3 and 4

| Joint | Beam 3 | | | Beam 4 | | |
|---|---|---|---|---|---|---|
| 1 | 75 | 75 | 0 | 90 | 75 | 0 |
| 2 | 85 | 85 | 0 | 95 | 90 | 0 |
| 3 | 95 | 50 | 0 | 90 | 25 | 0 |
| 4 | 70 | 45 | 0 | 60 | 75 | 0 |
| 5 | 60 | 80 | 0 | 90 | 65 | 0 |
| Average | 77 | 67 | 0% | 85 | 66 | 0% |

The above results from the manufacturing factory test proves that the glue joints fulfil present standard requirements, and that the wood failures after tearing apart the joints are normal and furthermore fully comparable with results obtained by use of conventional adhesive/hardener systems.

Those skilled in the chemical arts, and particularly in the art to which this invention pertains will readily appreciate that modifications of the basic invention set forth here are possible. For example, it is quite possible that other closely related compounds might work as well as the herein specifically described compounds and there would certainly be no invention involved in trying such closely related compounds, in view of the present broad disclosure. All of these modifications are considered to be within the scope of the present claims by virtue of the well-established "doctrine of equivalents".

I claim:

1. In the known method of glueing with resins formed from resorcinol-formaldehyde or resorcinol-phenol-formaldehyde precondensates and hardener compositions containing paraformaldehyde suspended in a suspending agent, the improvement which comprises using as a suspending agent for the paraformaldehyde a precondensate between a ketone and formaldehyde.

2. The method of claim 1 characterized in that the suspending agent is at least partially water soluble and contains water as a dilution media.

3. The method of claim 1 characterized in that the resin precondensate and the hardener component are separately applied to at least one of the joint surfaces in the form of separate strands.

4. A hardener composition that contains paraformaldehyde suspended in a precondensate between formaldehyde and lower ketones.

5. The hardener composition of claim 4 which contains water as a dilution agent.

6. The hardener composition of claim 4 which contains a filler.

7. The hardener composition of claim 4 which contains, expressed in percent by weight of the total hardener composition:

| | |
|---|---|
| ketone-formaldehyde precondensate | 20–40 |
| water | 10–30 |
| paraformaldehyde | 10–60 |
| filler | 0–50 |

8. The hardener composition of claim 4 wherein the ketone is acetone.

9. The hardener composition of claim 4 wherein the pH is between 2 and 6.

10. The hardener composition of claim 9 wherein the pH is between 3.5 and 5.

11. The hardener composition of claim 8 wherein the precondensate has a molar ratio of acetone-formaldehyde in the range of 1:2–1:5.

* * * * *